United States Patent
Dasgupta et al.

(10) Patent No.: US 9,516,025 B2
(45) Date of Patent: Dec. 6, 2016

(54) REDUCED AUTHENTICATION TIMES IN CONSTRAINED COMPUTER NETWORKS

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/616,223

(22) Filed: Feb. 6, 2015

(65) Prior Publication Data
US 2015/0156199 A1    Jun. 4, 2015

Related U.S. Application Data

(62) Division of application No. 13/631,106, filed on Sep. 28, 2012, now Pat. No. 8,984,277.

(51) Int. Cl.
*H04L 29/06* (2006.01)
*H04L 12/715* (2013.01)

(52) U.S. Cl.
CPC ........... *H04L 63/0884* (2013.01); *H04L 45/64* (2013.01); *H04L 63/062* (2013.01)

(58) Field of Classification Search
CPC ..... H04L 63/0884; H04L 63/062; H04L 45/64
See application file for complete search history.

(56) References Cited

U.S. PATENT DOCUMENTS

| | | | |
|---|---|---|---|
| 6,463,474 B1 * | 10/2002 | Fuh | H04L 63/0227 709/225 |
| 7,106,698 B1 | 9/2006 | Basso et al. | |
| 7,213,768 B2 | 5/2007 | Patel et al. | |
| 7,392,382 B1 | 6/2008 | Weis et al. | |
| 7,451,316 B2 | 11/2008 | Halasz et al. | |

(Continued)

FOREIGN PATENT DOCUMENTS

EP    2034661 A1    3/2009

OTHER PUBLICATIONS

Gnawali et al., "The Minimum Rank with Hysteresis Objective Function", Request for Comments 6719, Sep. 2012, 14 pages, Internet Engineering Task Force Trust.

(Continued)

*Primary Examiner* — Mohammed Waliullah
(74) *Attorney, Agent, or Firm* — Parker Ibrahim & Berg LLC; James M. Behmke; Stephen D. LeBarron

(57) ABSTRACT

In one embodiment, a capable node in a low power and lossy network (LLN) may monitor the authentication time for one or more nodes in the LLN. The capable node may dynamically correlate the authentication time with the location of the one or more nodes in the LLN in order to identify one or more authentication-delayed nodes. The node may then select, based on the location of the one or more authentication-delayed nodes, one or more key-delegation nodes to receive one or more network keys so that the key-delegation nodes may perform localized authentication of one or more of the authentication-delayed nodes. The capable node may then distribute the one or more network keys to the one or more key-delegation nodes.

14 Claims, 15 Drawing Sheets

(56) References Cited

U.S. PATENT DOCUMENTS

| | | |
|---|---|---|
| 7,703,691 B2 | 4/2010 | Patel et al. |
| 7,716,723 B1 | 5/2010 | Taylor et al. |
| 8,081,568 B2 | 12/2011 | Nallur et al. |
| 8,140,851 B1 | 3/2012 | Mynam et al. |
| 2004/0168054 A1 | 8/2004 | Halasz et al. |
| 2007/0110248 A1* | 5/2007 | Li .................. H04L 9/0836 380/278 |
| 2008/0207200 A1 | 8/2008 | Fein et al. |
| 2010/0169952 A1* | 7/2010 | Maki ............. H04L 63/0846 726/3 |
| 2011/0107421 A1 | 5/2011 | Mahone et al. |
| 2011/0194472 A1 | 8/2011 | Bahr |
| 2012/0052842 A1 | 3/2012 | Zinn et al. |
| 2012/0089835 A1* | 4/2012 | Peckover ............. G06F 21/10 713/168 |
| 2012/0096269 A1* | 4/2012 | McAlister ........... H04L 63/061 713/171 |
| 2012/0117268 A1 | 5/2012 | Shaffer et al. |
| 2012/0282934 A1 | 11/2012 | Simonsson et al. |
| 2012/0311677 A1* | 12/2012 | Chen ............... H04L 12/1822 726/4 |
| 2013/0031608 A1 | 1/2013 | Alfano et al. |
| 2013/0252583 A1 | 9/2013 | Brown et al. |

OTHER PUBLICATIONS

P. Thubert et al., "Objective Function Zero for the Routing Protocol for Low-Power and Lossy Networks (RPL)", Request for Comments 6552, Mar. 2012, 14 pages, Internet Engineering Task Force Trust.

Vasseur et al., "Routing Metrics Used for Path Calculation in Low-Power Lossy Networks", Request for Comments 6551, Mar. 2012, 30 pages, Internet Engineering Task Force Trust.

Winter et al., "RPL:IPv6 Routing Protocol for Low-Power Lossy Networks", Request for Comments 6550, Mar. 2012, 157 pages, Internet Engineering Task Force Trust.

Vinvi et al., "Invitation to Pay Additional Fees and, Where Applicable, Protest Fee", Patent Cooperation Treaty, International Application No. PCT/US2013/062126, mailed Dec. 12, 2013, 5 pages, European Patent Office, Nijswijk, Netherlands.

Rothenbucher et al., "Notification of Transmittal of the International Search Report and the Written Opinion of the International Searching Authority, or the Declaration", Patent Cooperation Treaty, International Application No. PCT/US2013/062126, mailed Feb. 18, 2014, 12 pages, European Patent Office, Rijswijk, Netherlands.

\* cited by examiner

REDUCED AUTHENTICATION TIMES IN CONSTRAINED COMPUTER NETWORKS

RELATED APPLICATION

This application is a Divisional of U.S. patent application Ser. No. 13/631,106, filed on Sep. 28, 2012, the contents of which are herein incorporated by reference.

TECHNICAL FIELD

The present disclosure relates generally to computer networks, and, more particularly, to node authentication efficiency in low power and lossy networks (LLNs).

BACKGROUND

Low power and Lossy Network Border Routers (LBRs) such as, e.g., Field Area Routers (FARs), are routers in a computer network (e.g., a Smart Grid) that are installed in the field at various locations to provide communication between nodes of a local computer network (e.g., a field area network (FAN), personal area network (PAN), etc.) and a central or wide area network (WAN). For example, on the "southbound," FARs may connect Low power and Lossy Network (LLN) domains that comprise a large number of devices (e.g., sensors and actuators) using low power shared-media links, such as wireless or powerline communication (PLC) links. On the "northbound," FARs communicate with the Utility Control Center using various backhaul technologies such as 2G, 3G, LTE, WiMax, etc., as will be understood by those skilled in the art. In other words, FARs often act as "root nodes" through which all of the traffic transits between the local network to a control center, and thus play a critical role in the network infrastructure.

In a typical FAN, such as one configured for Advanced Metering Infrastructure (AMI) applications, a FAR may communicate with thousands of end-points (nodes) on the downlinks (access network) using an IP-based mesh network. New mesh formation may happen frequently, for example, when a FAR is impacted by a failure or a software upgrade, or when a node migration occurs. A mesh network is typically secured using group-based encryption keys, and these keys are initially forwarded to the mesh nodes using a known authentication scheme. It has been observed that new mesh formation in an LLN with an intermittent backhaul connection may be significantly delayed, largely as a result of the authentication process.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
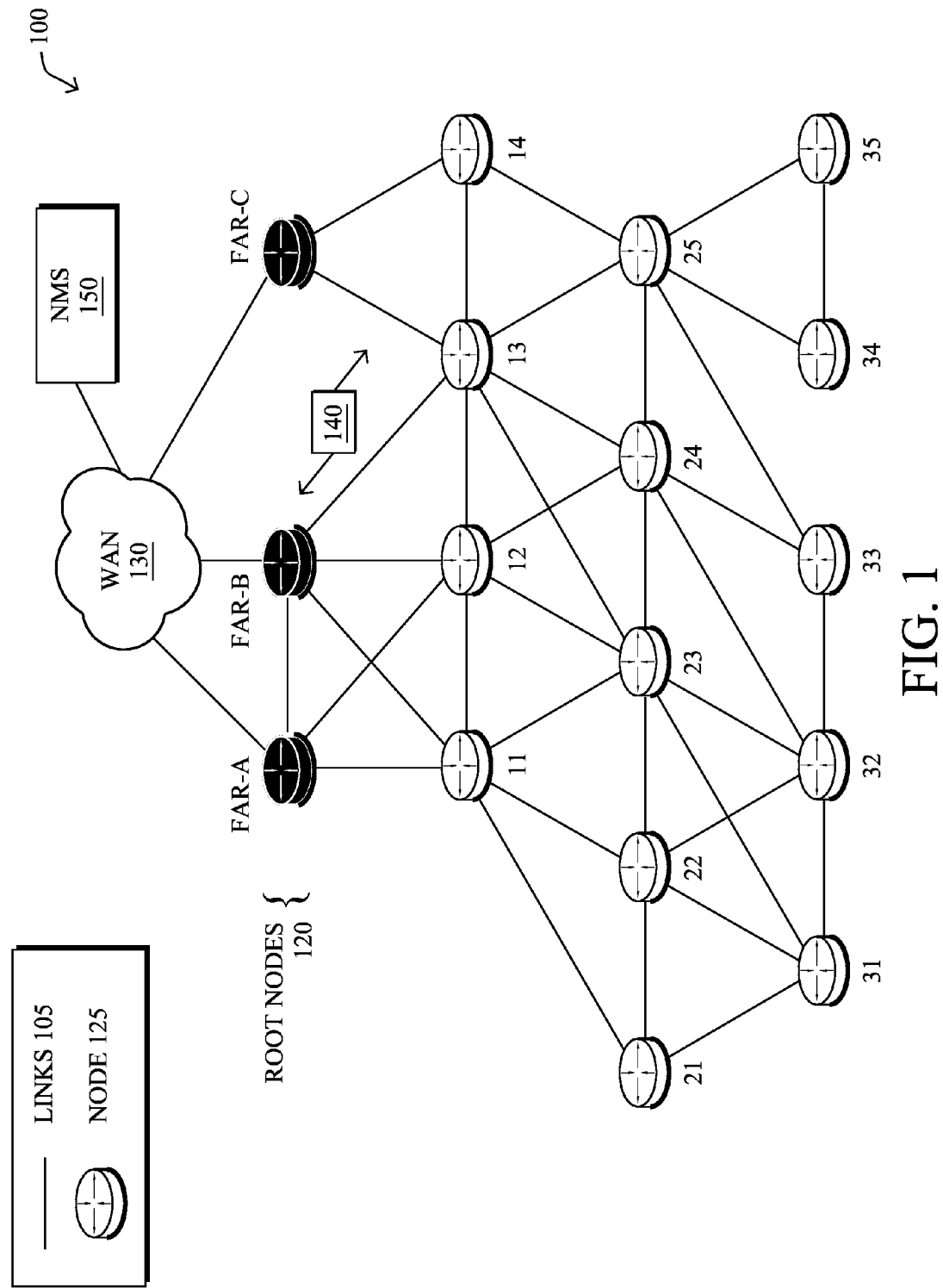
FIG. 1 illustrates an example computer network.

According to one or more embodiments of the disclosure, a capable node in a low power and lossy network (LLN) may monitor the authentication times for one or more nodes in the LLN. The capable node may then dynamically correlate the authentication times with the location of the one or more nodes in the LLN in order to identify one or more authentication-delayed nodes. Based on the location of the one or more authentication-delayed nodes, the capable node may then select other one or more key-delegation nodes to receive one or more network keys so that the key-delegation nodes may perform localized authentication of a subset of the authentication-delayed nodes. The capable node may then distribute the one or more network keys to the one or more key-delegation nodes.

According to one or more additional embodiments of the disclosure, a dynamically selected key-delegation node in a computer network receives, from a border router, one or more network keys. In response to receiving an authentication request from one or more authentication requesting nodes in the computer network, the key-delegation node may distribute the one or more network keys to the one or more authentication requesting nodes, accordingly. In addition, the key-delegation node also forwards the authentication request from the one or more authentication requesting nodes to an authentication server via the border router, and may then receive, from the authentication server via the border router, an authentication reply, where the authentication reply is either confirmation or rejection of authentication.

According to one or more additional embodiments of the disclosure, an authenticated node in a computer network logs authentication requests received from an authentication requesting node, and determines a priority level for the authentication requests based on a number of authentication requests received from the authentication requesting node. Illustratively, a higher priority is given to the authentication requests in response to the number being greater than a threshold, and a standard priority is given to the authentication requests in response to the number being below the threshold. Accordingly, the authenticated node forwards the authentication requests toward an authentication server according to the determined priority level.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 125 (e.g., labeled as shown, "11," "12," . . . "35", and described in FIG. 2 below) and a plurality of root nodes or field area routers (FARs) 120 (e.g., "A," "B," and "C") interconnected by various methods of communication. For instance, the links 105 may be shared media (e.g., wireless links, PLC links, etc.), where certain nodes 125, such as, e.g., routers, sensors, computers, etc., may be in communication with other nodes 125, e.g., based on distance, signal strength, current operational status, location, etc. In addition, a management device 150, such as a network management server (NMS), head-end application, etc., may also be in communication with the computer network, such as via a WAN 130 or backhaul link to the FARs/root nodes, as shown. Those skilled in the art will understand that any number of nodes, devices, links, etc. may be used in the computer network, and that the view shown herein is for simplicity.

Data packets 140 (e.g., traffic and/or messages) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
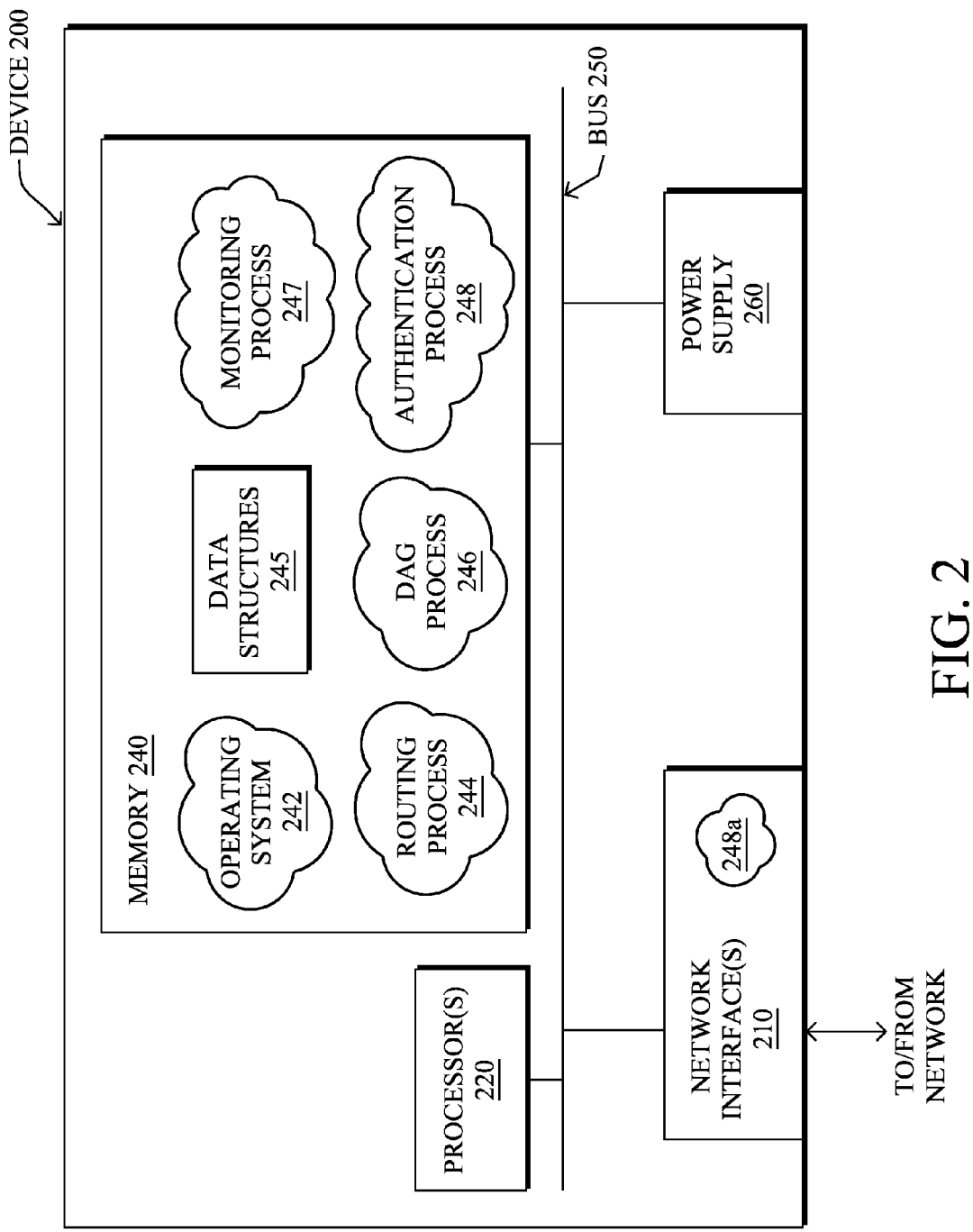
FIG. 2 illustrates an example network device/node.

FIG. 2 is a schematic block diagram of an example node/device 200 that may be used with one or more embodiments described herein, e.g., as any of the nodes 125 shown in FIG. 1 above, the FARs 120, or the network management device (e.g., NMS) 150. The device may comprise one or more network interfaces 210, at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols, particularly shared-media protocols (e.g., wireless, PLC, etc.) for nodes 125, and optionally a wired protocol for the management device 150 (and also optionally for the FARs/root nodes). That is, certain nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services on nodes 125 may comprise routing process/services 244, an optional directed acyclic graph (DAG) process 246, and an illustrative monitoring process 247 and authentication process 248, as well as other various processes not explicitly shown, such as for applications, etc., operating on the device. The management device 150 may also comprise an illustrative security process 248. Note that while monitoring process 247 and authentication process 248 are shown in centralized memory 240, alternative embodiments provide for the process on nodes 125 (or FARs/root nodes 120) to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Request for Comment (RFC), entitled "RPL: IPv6 Routing Protocol for Low Power and Lossy Networks"<RFC 6550> by Winter, at al. (March 2012 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
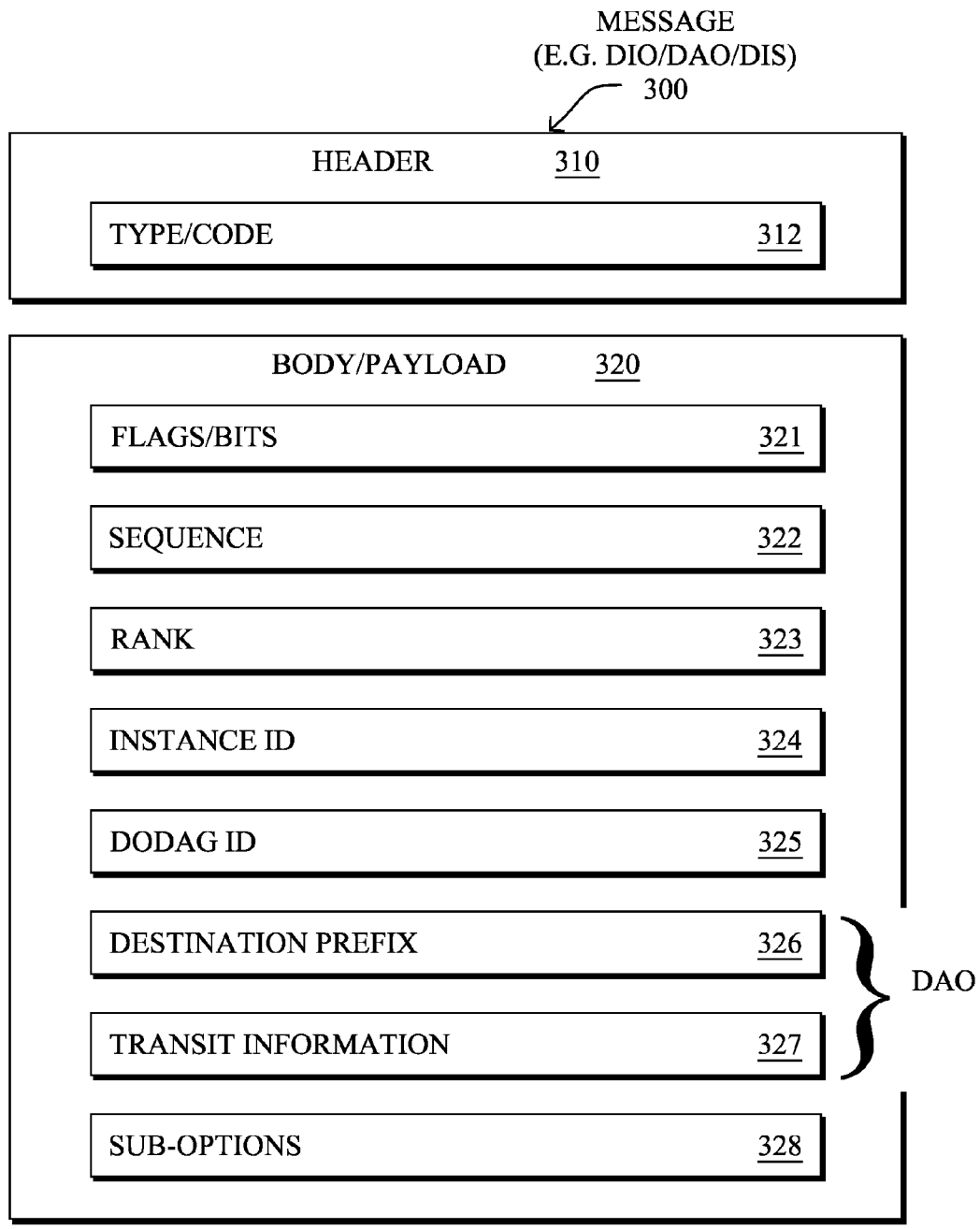
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
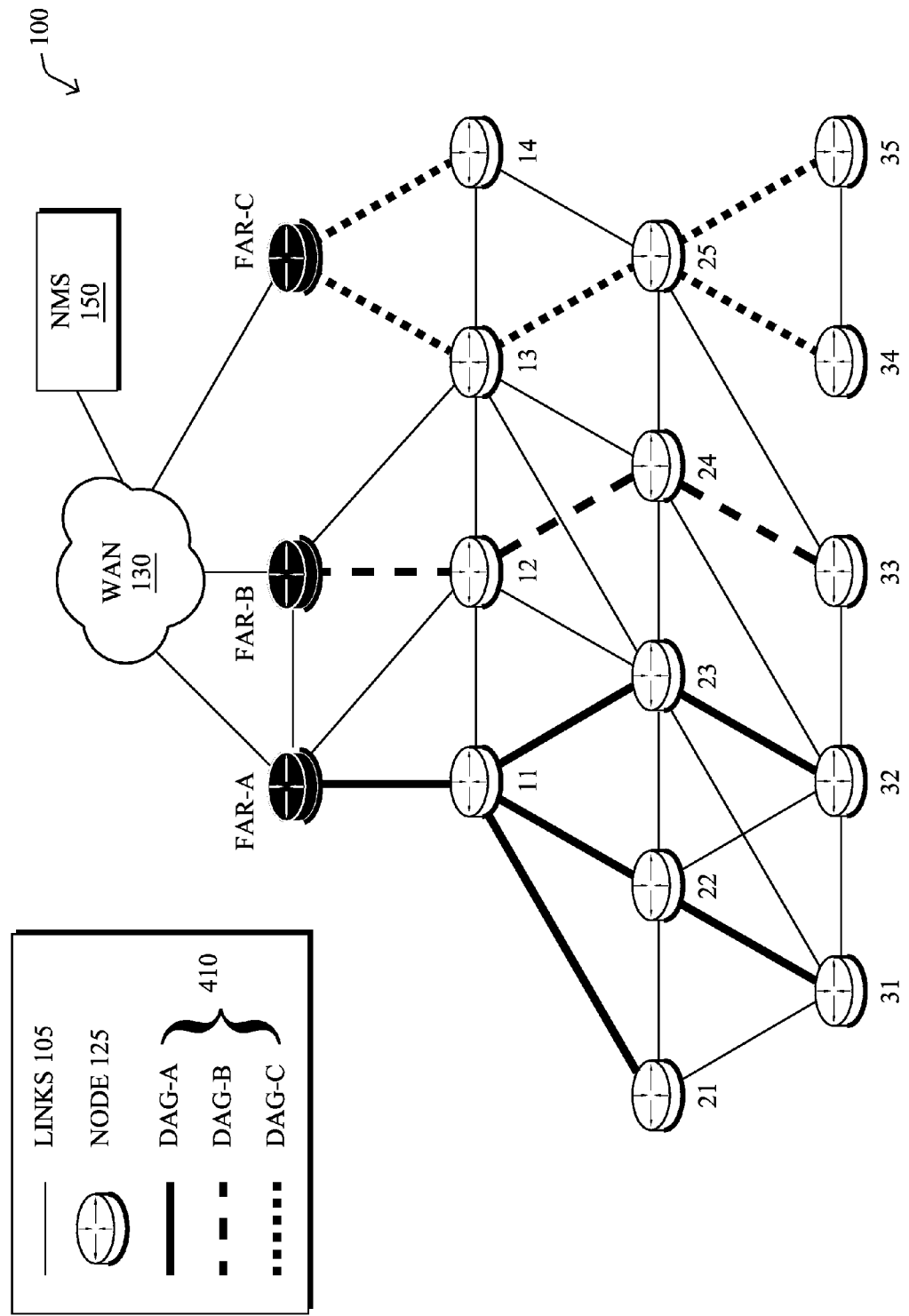
FIG. 4 illustrates an example of directed acyclic graphs (DAGs) in the computer network in FIG. 1.

FIG. 4 illustrates example simplified DAGs that may be created, e.g., through the techniques described above, within network 100 of FIG. 1, to each of the root nodes (FARs) 120. For instance, certain links 105 may be selected for each node to communicate with a particular parent (and thus, in the reverse, to communicate with a child, if one exists). These selected links form the DAGs 410, which extend from the root nodes toward one or more leaf nodes (nodes without children), e.g., DAG-A, DAG-B, and DAG-C. Traffic/packets 140 (shown in FIG. 1) may then traverse the DAGs 410 in either the upward direction toward the corresponding root or downward toward the leaf nodes, particularly as described herein. Note that while DAGs 410 is shown, other types of routing instances or topologies may be used herein, as may be appreciated by those skilled in the art. In addition, nodes 125 may simply communicate directly with the root nodes or FARs, and in such an embodiment, would not require the hierarchical communication created within the DAGs 410 as shown.

Network join/joining time is defined by the amount of time it takes a network node 125 to begin communicating with other nodes, and with the necessary application endpoints. To reach this final end goal, a typical network node 125 must complete a number of steps:

1) Discover a network, referred to often as a field area network (FAN) or personal area network (PAN) (i.e., a specific network in IEEE 802.15.4 terminology);
2) Perform 802.1x-based mutual authentication and obtain link security keys (or other forms of authentication) for the corresponding FAR/network, such as from authentication, authorization and accounting (AAA) servers (note that unlike conventional WiFi Access Point (AP) roaming, such as where a node is moving from an AP to another one that is in the same subnet, the security keys across FARs are generally not the same);

3) Discover a route or routes (e.g., a default route, such as a DAG 410 by using RPL, which by itself involves a number of steps);

4) Configure a global IPv6 address (e.g. by using DHCPv6); and

5) Advertise the global IPv6 address to configure downward routes (e.g., by using RPL).

The ratio of nodes 125 devices to FARs 120 can typically be anywhere from 1000 to 5000 nodes for every FAR. As a result, each PAN will typically contain from 1000 to 5000 nodes. Furthermore, many LLN deployments can be dense, and nodes can easily have hundreds of neighbors. For these reasons, properly building a stable network topology can take tens of minutes, if not hours.

As noted above, in a typical field area network, such as one configured for Advanced Metering Infrastructure (AMI) applications, a FAR 120 may communicate with thousands of end-points (nodes 125) on the downlinks (access network) using an IP-based mesh network. The nodes themselves, which may be stationary nodes, may actually connect to one or more FARs depending on various factors such as their proximity, available signal strength, interference, availability of suitable neighbors, etc. In some areas, these factors change very often, and what has been observed in deployed networks is that as many as 35% of the nodes migrate (roam) to adjoining FARs on a daily basis.

Authentication is an important aspect of a constrained computer network such as an LLN. Typically, all nodes within an LLN such as, for example, a FAN or PAN, must undergo an authentication process in order to join the network. Conventionally, the authentication process for an LLN involves the relay of an authentication request by a capable node (e.g., a Root, LBR, FAR, etc.) to an authentication server/device (e.g., an NMS), which assesses the validity/legitimacy of the request. The relay of the authentication request usually occurs over a backhaul connection between the Root and the back-end infrastructure. Unfortunately, in many real-world LLN deployments it has been observed that backhaul connectivity is often unreliable, intermittent ("flappy"), and/or prone to periodic outages, which can have a significant deleterious effect on the ability of nodes within the LLN to join, or re-join, the network.

A mesh network is typically secured using group-based encryption keys and these keys are initially forwarded to the mesh nodes using a known authentication scheme. The process of node authentication and network admission is quite expensive, especially in low bandwidth mesh networks, and places a significant load on the security servers. It has been observed that the authentication process is a large component of the total time required for a node to join a network; a major issue considering that node join time is a critical component for many service level agreements (SLAs).

Figure 5:
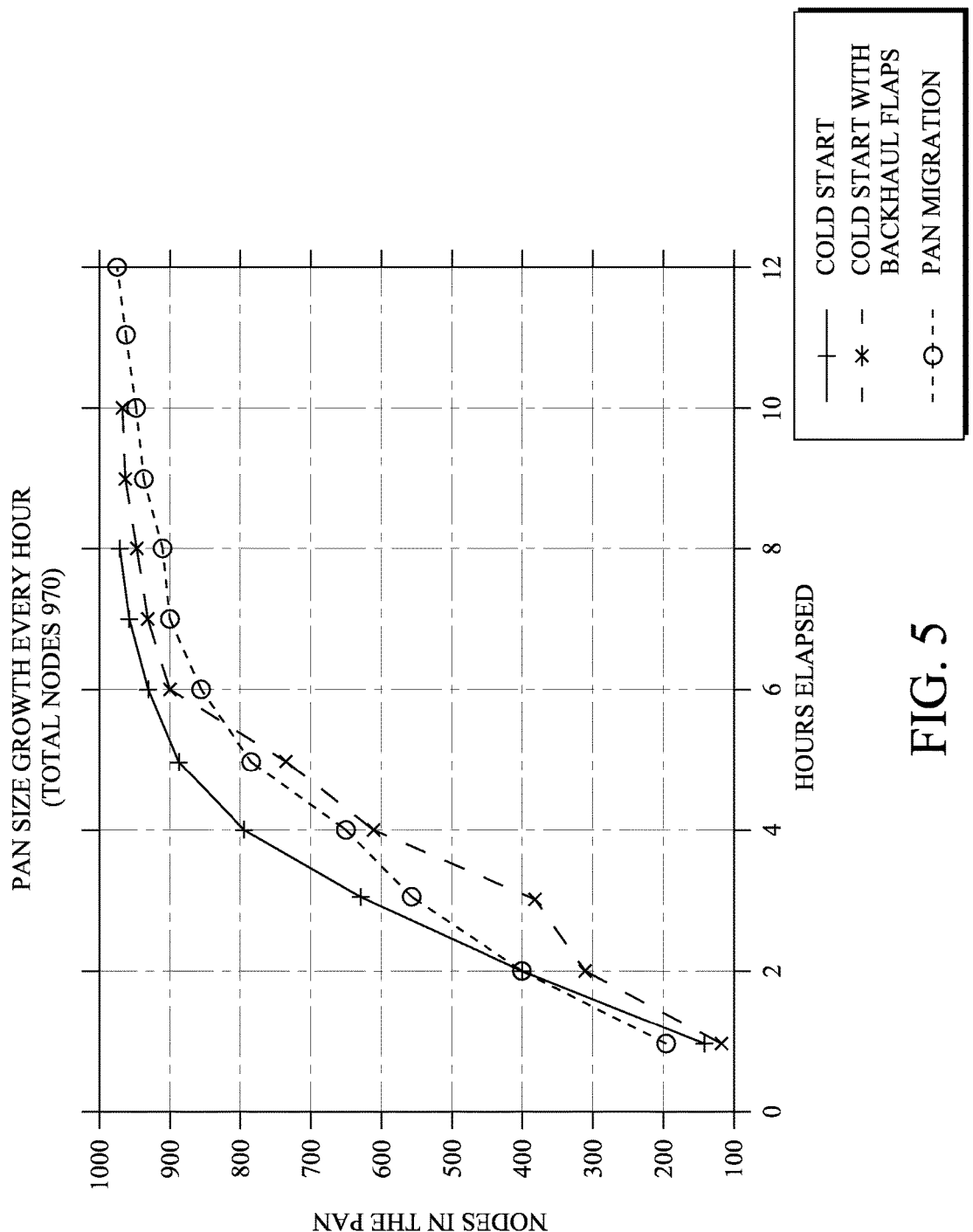
FIG. 5 illustrates an example personal area network (PAN) size growth plot for a conventional mesh formation.

New mesh formation may occur frequently (e.g., as a result of FAR failure, node failure, node migration, etc.), and is negatively affected by a flappy backhaul connection. For example, FIG. 5 shows a PAN-size-growth plot illustrating mesh formation for a deployed network. As shown in FIG. 5, it may take up to 20 hours to form a 1,000 node mesh in the presence of a flappy backhaul connection, even in a deployed network, and much of this delay arises from the authentication process. Interestingly, FIG. 5 reveals that it only takes a few hours for the first 80% of nodes within the network to join, however, it takes a very long time for the remaining 20% of nodes within the network to join because they are a significant distance away from the Root/LBR. Such authentication-induced delays in new mesh formation are expected to increase significantly in larger LLNs (e.g., 2,000 nodes, 5,000 nodes, 10,000 nodes, etc.) in which some nodes may be 20, or more, hops away from the LBR. Additionally, as long as nodes seeking to join the network remain unauthenticated, they will continue sending authentication requests, which may decrease the resources (e.g., battery levels) of the node/device seeking to join the network, and increase both network latency and the number of dropped packets.

Reduced Authentication Times in Constrained Computer Networks

The techniques herein provide improved reliability and efficiency for the authentication of nodes in a constrained computer network (e.g., an LLN) with an unreliable backhaul connection (e.g., between a meter network and utility network). In particular, the techniques herein provide that a population of specific key-delegation nodes within the LLN may be dynamically selected and seeded with network/link keys. The key-delegation nodes may then facilitate the transmission of authentication requests between nodes seeking to join the network and an authentication device (e.g., an NMS/AAA) on the other side of the backhaul connection, which may prevent the long delays that can occur in conventional art solutions in which network/keys are obtained and authenticated over a flappy backhaul connection. To further reduce authentication delays that may result from an unreliable backhaul connection, a root node (e.g., an LBR, FAR, etc.) may buffer specific authentication requests from nodes seeking to join the network, and send the buffered authentication request to the authentication device once the backhaul connection is restored. The root node may also send a specific acknowledgement of the buffered authentication request to the requesting node(s) in order to prevent the unnecessary re-transmission of authentication requests within the LLN. Additionally, the root may assess the state of the backhaul connection and/or the constrained computer network, and proactively communicate a migration request message to the requesting node to instruct the requesting node to migrate to another network (e.g., a PAN) if possible. The key-delegation nodes may also prioritize authentication requests based on an analysis of the origin of the requesting node (e.g., by establishing a priority queue).

Illustratively, the techniques described herein may be performed by hardware, software, and/or firmware, such as in accordance with the "authentication" process 248/248a shown in FIG. 2, which may contain computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the various shared-media authentication protocols (e.g., IEEE Std. 802.1x based authentication schemes) or routing protocols (e.g., RPL), and as such, may be processed by similar components understood in the art that execute those protocols, accordingly.

Operationally, the techniques herein generally relate to reducing authentication times for nodes seeking to join a constrained network. According to the techniques herein, one or more portions of the authentication process normally associated with an authentication device (e.g., an NMS or AAA) may be delegated to specific nodes within the constrained network, which are referred to as key-delegation nodes. For example, the authentication device, via the Root, may push network keys to specific nodes within the network that have already been authenticated in order to reduce the above-discussed conventional art problem of high authentication times in a cold-boot mesh formation scenario or a node migration scenario. Notably, network key delegation according to the techniques herein may be static and/or dynamic.

Figure 6A:
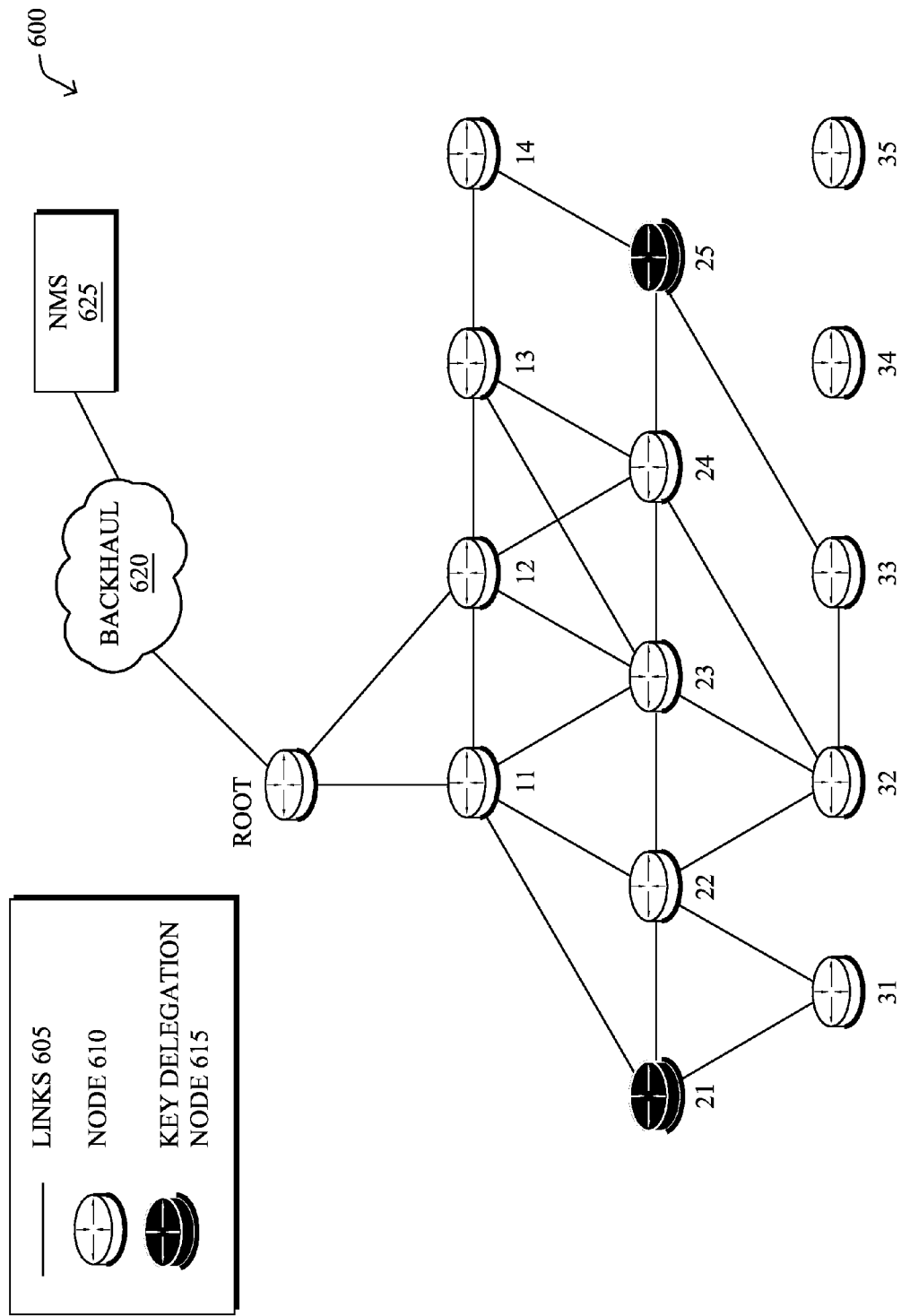
FIGS. 6A-F illustrate node authentication by a statically deployed key delegation node(s)
Figure 6B:
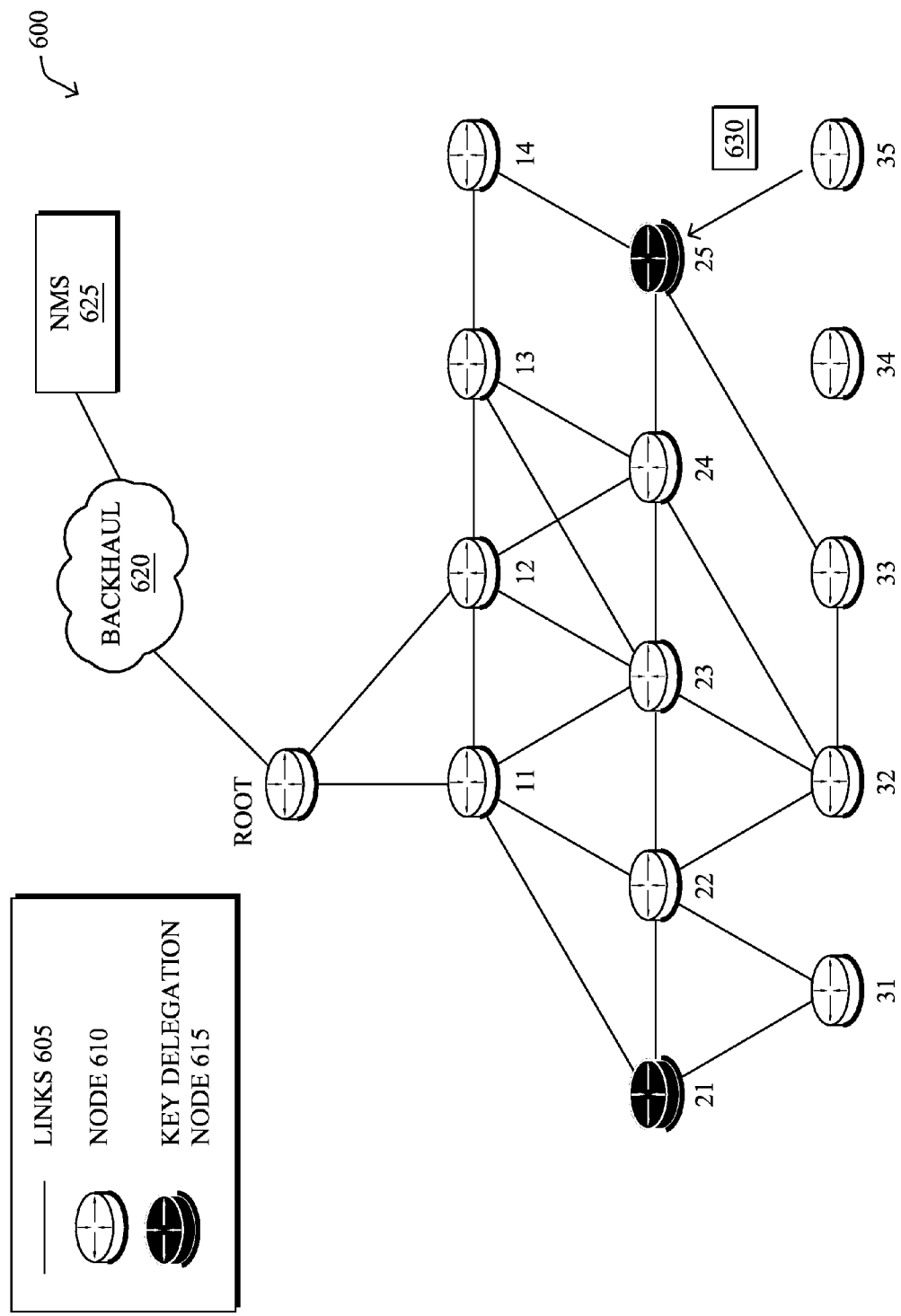
Figure 6C:
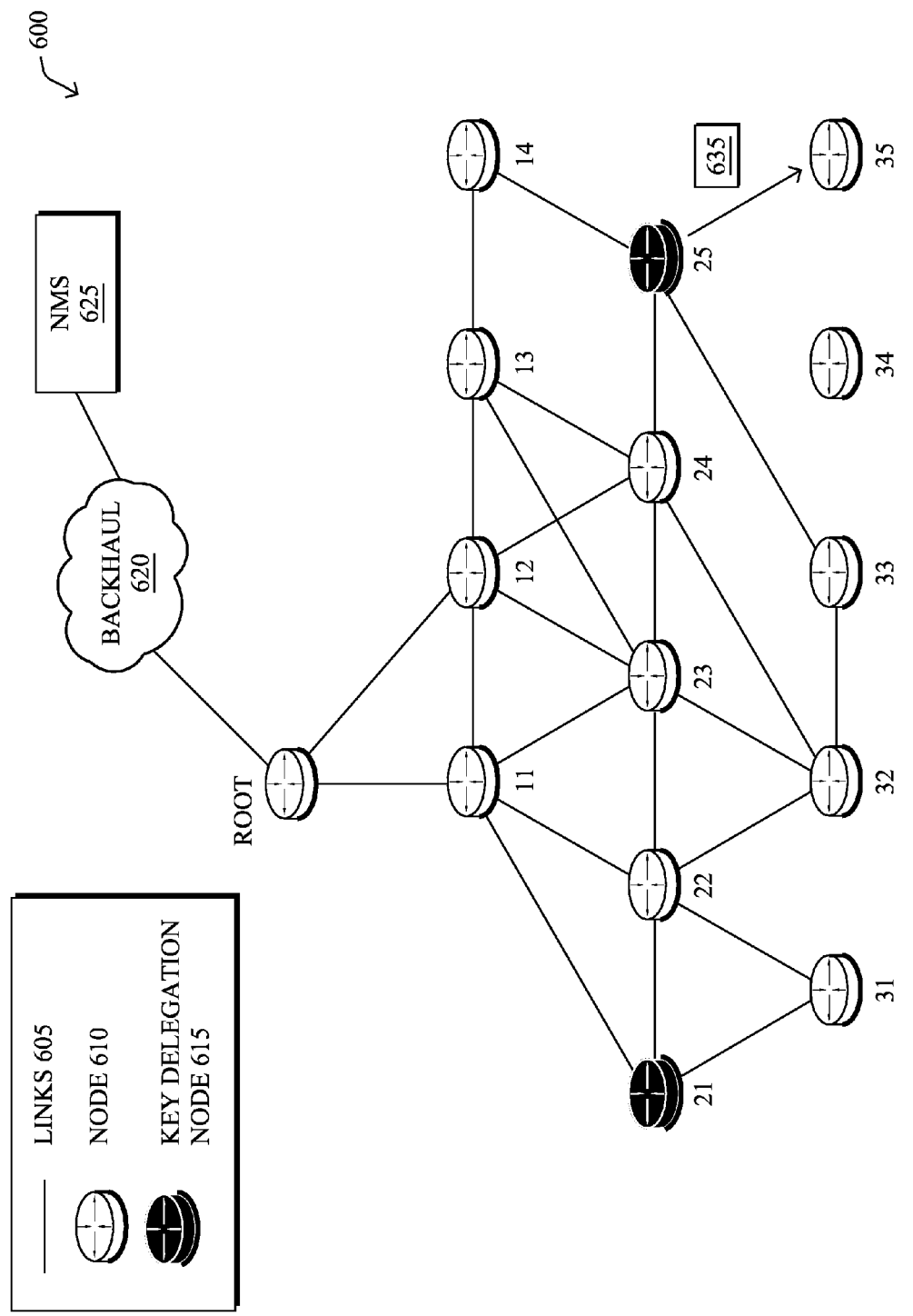
Figure 6D:
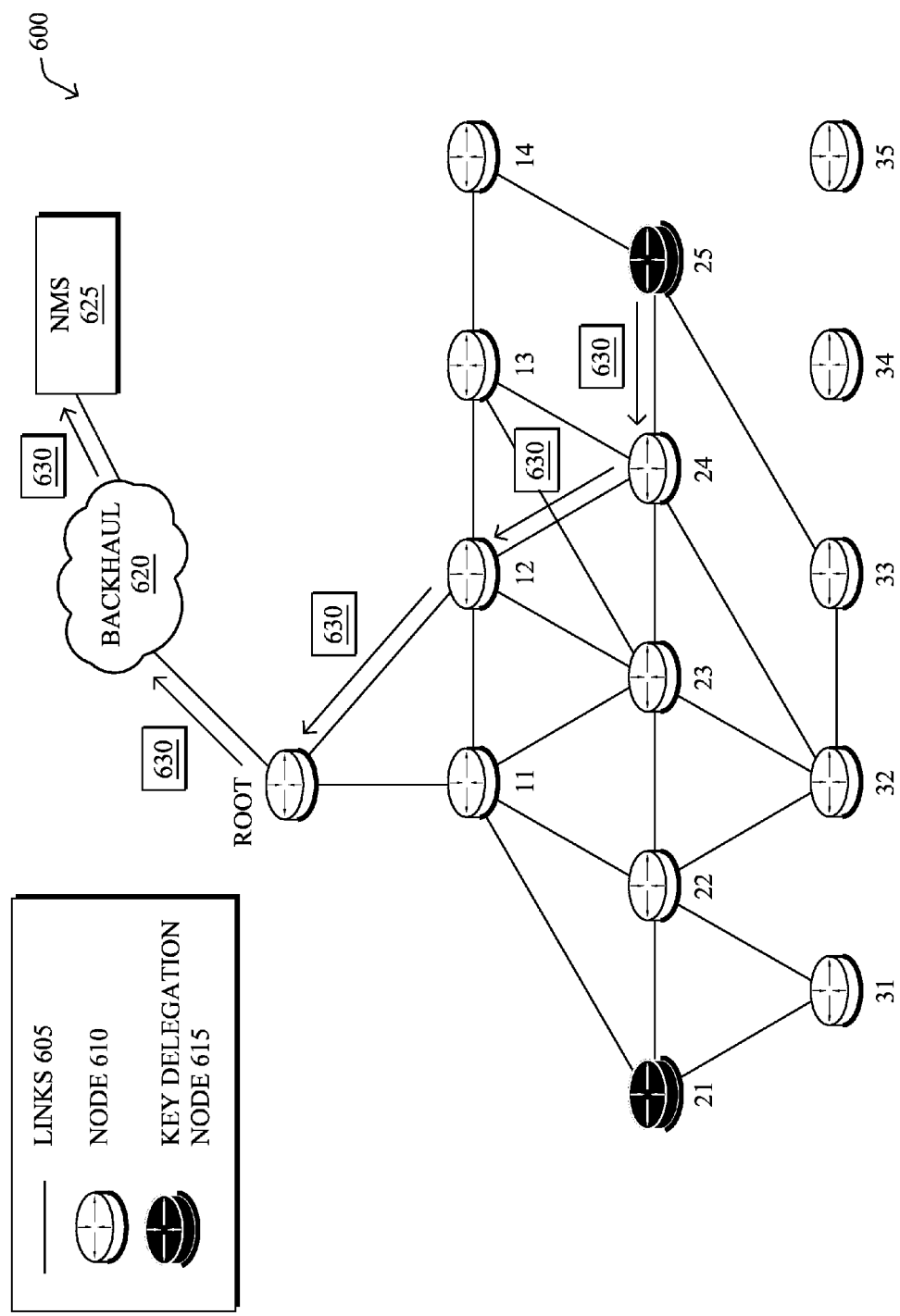
Figure 6E:
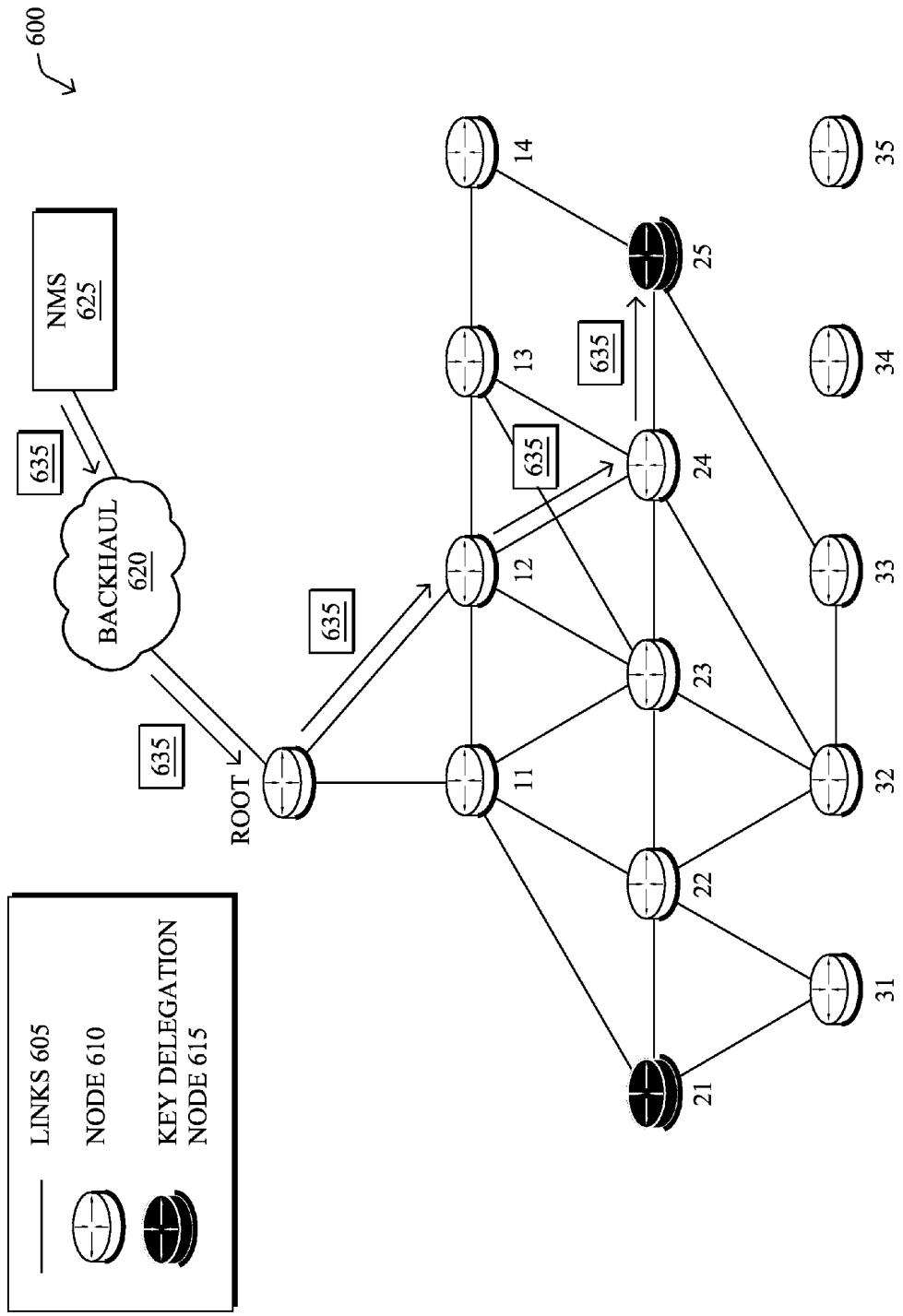
Figure 6F:
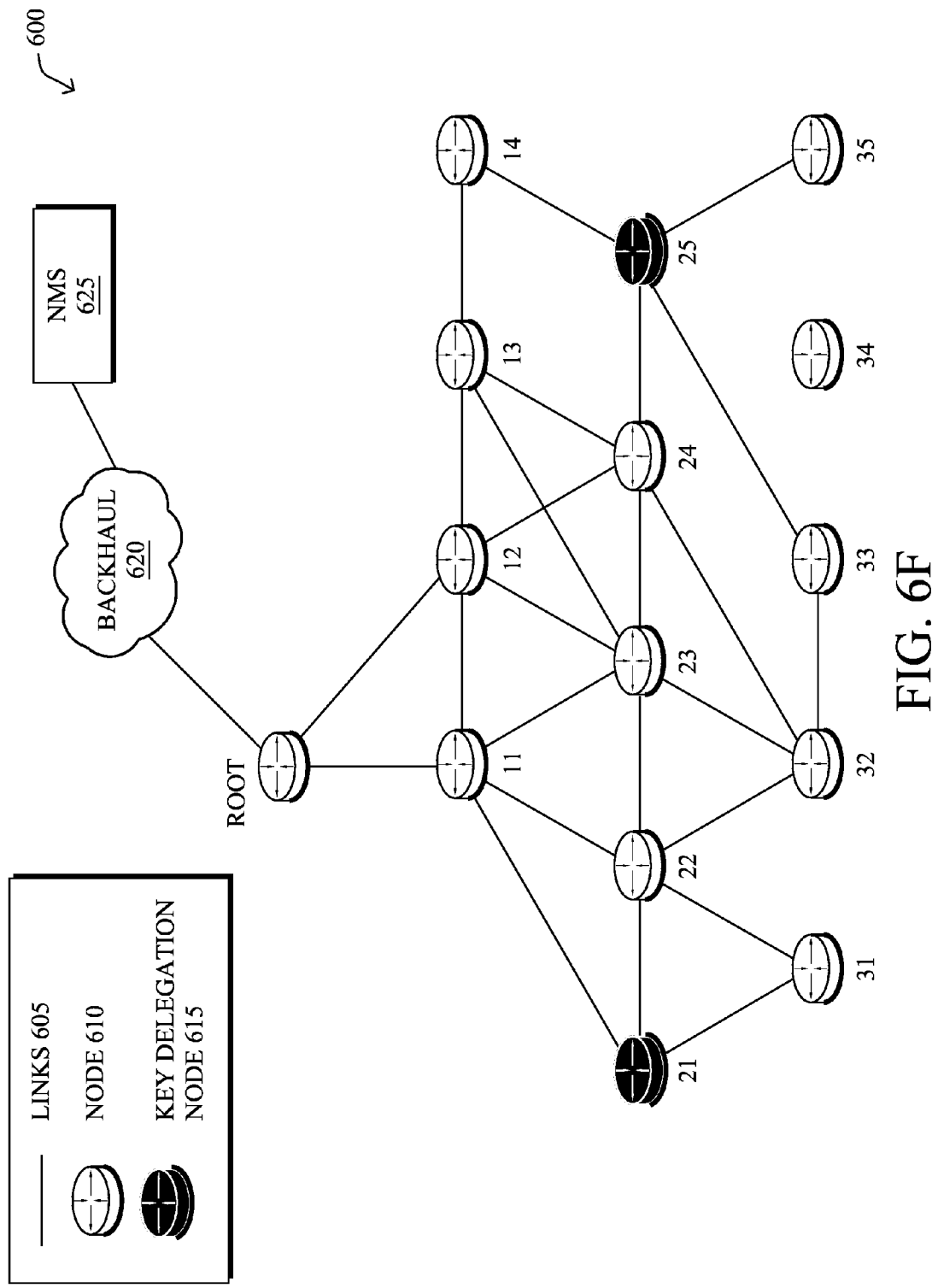

FIGS. 6A-F illustrate "static" network key delegation according to the techniques herein. In particular, FIG. 6A depicts network 600, comprising a plurality of links 605, nodes 610, and two exemplary key-delegation nodes 615 (which may include network keys and be statically placed within network 600), backhaul connection 620, and NMS 625. In other words, key-delegation nodes 615 (e.g., nodes 21 and 25) may be pre-loaded with network keys and positioned within network 600 such that they are able to interact with other nodes in the network (e.g., a large proportion). New nodes (e.g., nodes 34 and 35 in network 600) may then try to join network 600 by relying on key-delegation nodes 615. As shown in FIG. 6B, a node (e.g., node 35) seeking to join, or re-join, network 600 may send an authentication request 630 (e.g., an 802.1x join request) to key delegation node 615 (e.g., node 25). The key-delegation node may then forward network key 635 to the new node as shown in FIG. 6C, and then forward the authentication request 630 to NMS 625 via the Root and backhaul connection 620 as illustrated in FIG. 6D. The NMS 625 may then return authentication reply 630 to the key-delegation node (FIG. 6E), either authenticating the new node as shown in FIG. 6F or rejecting the new node. The use of a key-delegation node(s) according to the disclosure may significantly reduce the amount of time required for authentication of a new node within exemplary network 600.

According to the techniques herein, key-delegation nodes may also be established dynamically. For example, the Root/LBR may monitor authentication times for the nodes that are joining the network via monitoring process 247, and correlate these authentication times with the physical, logical, and/or geographical location of the nodes within the network and/or their position within a DAG. Based on such positional information, the root may strategically choose certain nodes within the network as key-delegation nodes, and populate them with one or more network keys. Once the key-delegation nodes have been dynamically created, the remainder of the process would function similarly to the "static" process described above (see FIGS. 6A-6F).

In one or more embodiments, the dynamic creation of key-delegation nodes may be facilitated by message 300 comprising a new type-length-variable (TLV) in sub-option fields 328 carried in the DAO that allows a node within a network to "advertise" its capabilities or properties to the Root/LBR. For example, if the sub-DAG size of the node becomes greater than a particular threshold (e.g., 5, 10, 15, 20, 30, 40, 50, 60, 70, 80, 90, 100, 200, etc., nodes), the node may be selected as a key-delegation node by the Root. As another example, a key-delegation node may be selected based on its distance from the DAG root (e.g., if the diameter of the developing mesh relative to the Root becomes too large). Similarly, if the computational/memory resources of a node are not being fully utilized, the node may advertise its availability to the Root, which may then choose the node as a key-delegation node.

In another embodiment, creation of key-delegation nodes may optionally be augmented with a set of rules that limit the total number of nodes that may be authenticated by a particular key-delegation node, which may provide additional network security by reducing the predictability of nodes that are providing network keys, while not over-taxing constrained nodes. Once such a limited key-delegation node has reached its authentication limit, it may cease providing network keys in response to received authentication requests, and the Root may choose another key-delegation node. It is also contemplated within the scope of the disclosure that once such a limited key-delegation node has reached its authentication limit, it may select a previously authenticated neighboring node to be a substitute key-delegation node, and delegate its network keys to that selected node.

In yet another embodiment, a node that fails authentication may be allowed to function in a "restricted" mode for a specific amount of time referred to as the "restricted window." For example, the key-delegation node may multicast details of the node that failed authentication to its sub-DAG, along with the "restricted window," such as through an explicit notification message or else as part of a routing protocol message (e.g., as part of a sub-option 328). Upon receiving this information, nodes that have already joined the PAN may refrain from communicating with the failed/rejected node and/or from choosing the failed node as a parent in a DAG. According to the techniques herein, once the "restricted window" has expired, the node may once again attempt to join the network, and the cycle will repeat until the node has either joined the network or been permanently prevented from joining the network. Optionally, the "restricted window" may be continually increased between every authentication attempt to prevent a malicious node from joining the network or saturating the channel(s).

In yet another embodiment, a node seeking to join the network may piggyback information about its neighbors and environment on its authentication request. Advantageously, this may allow potential parent nodes, the Root, and/or the NMS to gain information about the local area/network topology within the vicinity of the requesting node. Additionally, the requesting node may begin sensing its environment before any authentication has taken place. Advantageously, this may allow network management entities to get information about local areas/network topology surrounding the new node.

According to the techniques herein, the above-described methods may be augmented by the ability of the Root/LBR to buffer incoming authentication requests when the backhaul connection is intermittent and/or completely down, thereby preventing the authentication request from being dropped. More particularly, the techniques herein provided a buffering mechanism that is aware of the position of the requesting node within the network (e.g., within a DAG). As discussed above, authentication time may be proportional to the distance (e.g., number of hops) of the requesting node from the Root/NMS (or, generally, from a backhaul link). Accordingly, the duration of time for which an authentication request will be buffered by the Root, may be proportional to the number of hops the requesting node is away from the Root. Additionally, the Root may optionally send the requesting node an acknowledgement indicating that the backhaul connection is either intermittent, or down, and that the requesting node's authentication request is being buffered by the Root. Advantageously, this may also prevent the requesting node from unnecessarily re-transmitting the authentication request. Once backhaul connectivity is restored, the Root may send out its buffered authentication requests, preferably on a first in, first out basis. The Root may also prioritize these authentication requests over periodic CoAP (Constrained Application Protocol) messages, and also periodically purge old authentication requests to ensure that redundant requests are not being transmitted.

In another embodiment, the techniques herein may provide proactive messaging by the root in order to promote migration of nodes to another network, if possible. For example, if the Root receives an authentication request from a node seeking to join the network, it may send a message back to the node (e.g., in the form of a 802.1x reply) asking the node to migrate to another PAN if possible. Such node migration requests may be implemented in a variety of situations, such as described below.

Illustratively, in one or more embodiments, a Root that is aware that its backhaul connection often goes down for long periods of time (e.g., by logging backhaul connectivity loss over time), may immediately send a node migration reply to the requesting node. Upon receipt of such a reply, the requesting node may migrate to another network if possible. If migration is not possible, the requesting node may stop sending authentication requests for a particular period of time, after which it may continue attempting to join the network. Advantageously, re-initiation of authentication requests from such a node may inform the Root that no other networks are visible to that particular requesting node, which may provide valuable network topology information to the Root. As another example, the Root may send a node migration reply to the requesting node when it authentication request buffer is full.

To avoid the possibility of node migration induced oscillations among LLNs within a complex network, the techniques herein provide that Root nodes (e.g., FARs) may communicate LLN-related metrics (e.g., network size, authentication statistics, authentication request buffer state, etc.) with one another. For example, information exchanged by FARs may include, but is not limited to, the following:
- backhaul connectivity statistics (e.g., duration of connection up-time/down-time per day, average inter-down/up state time, etc.);
- number/percentage of failed authentication requests due to backhaul connectivity loss;
- number of pending authentication requests (e.g., buffer state);
- etc.

According to the techniques herein, the ability of Root nodes to periodically exchange such information may prevent unnecessary node migrations among LLNs and the resulting over-burdening of FARs that could occur as a result. This may also allow neighboring FARs to offer better authentication services. For example, FARs may also share information regarding restoration of backhaul connectivity in an LLN, which may allow nodes from other PANs to migrate to the PAN with an active backhaul connection. Conversely, knowledge of when the backhaul connection for a particular LLN/PAN goes down may allow nodes waiting for authentication within that particular LLN/PAN to migrate to a PAN with a more favorable backhaul connection.

FARs often have multiple options with respect to inter-FAR connectivity. For example, multiple FARs may communicate via a utility's WiMAX or WiFi infrastructure. According to the techniques herein, this may allow a FAR with an inoperative backhaul connection to relay authentication requests from a node to a neighboring FAR over the WiMAX or WiFi infrastructure, to be forwarded over the neighboring FARs backhaul to, for example, an NMS. In such a case, the first FAR may also send a reply back to the requesting node to wait for a specified period of time before sending another authentication request because the inter-FAR relay of these join requests could take more time than a direct backhaul connection. Such information based message relaying may be possible as a result of the sharing of network statistics between various FARs. Once the requesting node successfully migrates to another PAN, the techniques herein provide that the first FAR may ignore any previous join requests sent by the requesting node prior to migration if, by chance, an earlier authentication request by that nodes does reach an authentication device associated with the previous FAR because the inter-FAR communication of information may enable it to know that a newer authentication reply was sent and that the node has now joined a different PAN.

In another embodiment, the techniques herein provide that a key-delegation node may relay authentication requests (e.g., 802.1x join requests) as described above, but may also maintain a log of the number of authentication attempts made by a particular requesting node. Once the requesting node has exceeded a particular threshold number of authentication attempts, the key-delegation node may then give the authentication requests from that particular requesting node a higher priority of transmission (e.g., by establishing a priority queue for transmitting authentication requests). In this manner, nodes that have been unable to join for a long period of time may have their authentication requests expedited by the key-delegation node. Advantageously, such priority queues may prevent new authentication requests from nodes that are physically close to the FAR from superseding earlier authentication requests from nodes that are physically farther away from the FAR.

Figure 7:
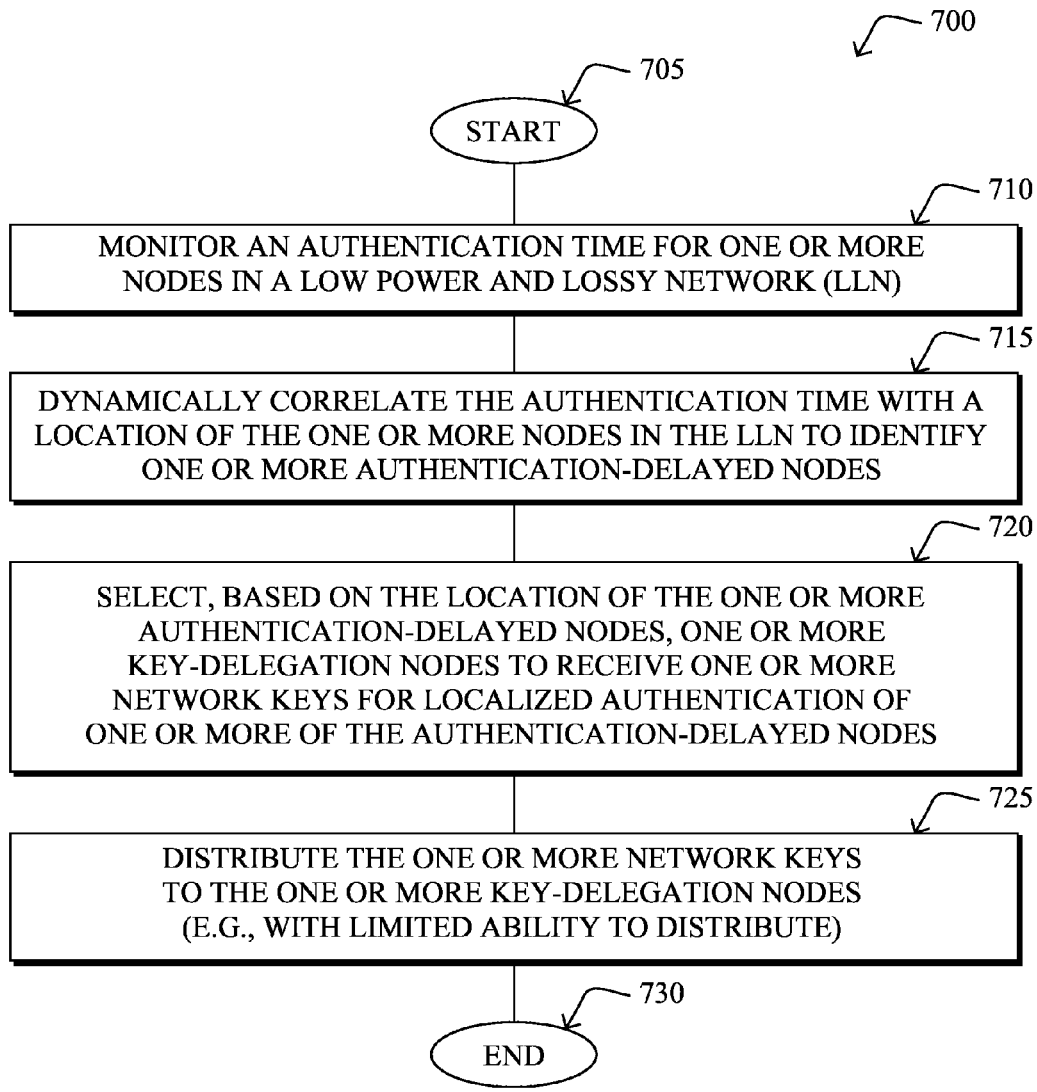
FIG. 7 illustrates an example simplified procedure for reducing authentication times in a constrained computer network, particularly from the perspective of a border router (or other capable node)

FIG. 7 illustrates an example simplified procedure 700 for reducing authentication times in a constrained computer network in accordance with one or more embodiments described herein, particularly from the perspective of a border router (or other capable node). The procedure 700 may start at step 705, and continues to step 710, where, as described in greater detail above, a capable node in a low power and lossy network (LLN) may monitor an authentication time for one or more nodes in the LLN. As shown in step 715, the capable node may dynamically correlate the authentication time with a physical, logical, and/or geographical location of the one or more nodes in the LLN in order to identify one or more authentication-delayed nodes. The node may then select, based on the location of the one or more authentication-delayed nodes, one or more key-delegation nodes to receive one or more network keys so that the key-delegation nodes may perform localized authentication of one or more of the authentication-delayed nodes, as depicted in step 720. The capable node may then distribute the one or more network keys to the one or more key-delegation nodes, as shown in step 725. The procedure 700 then illustratively ends in step 730.

Figure 8:
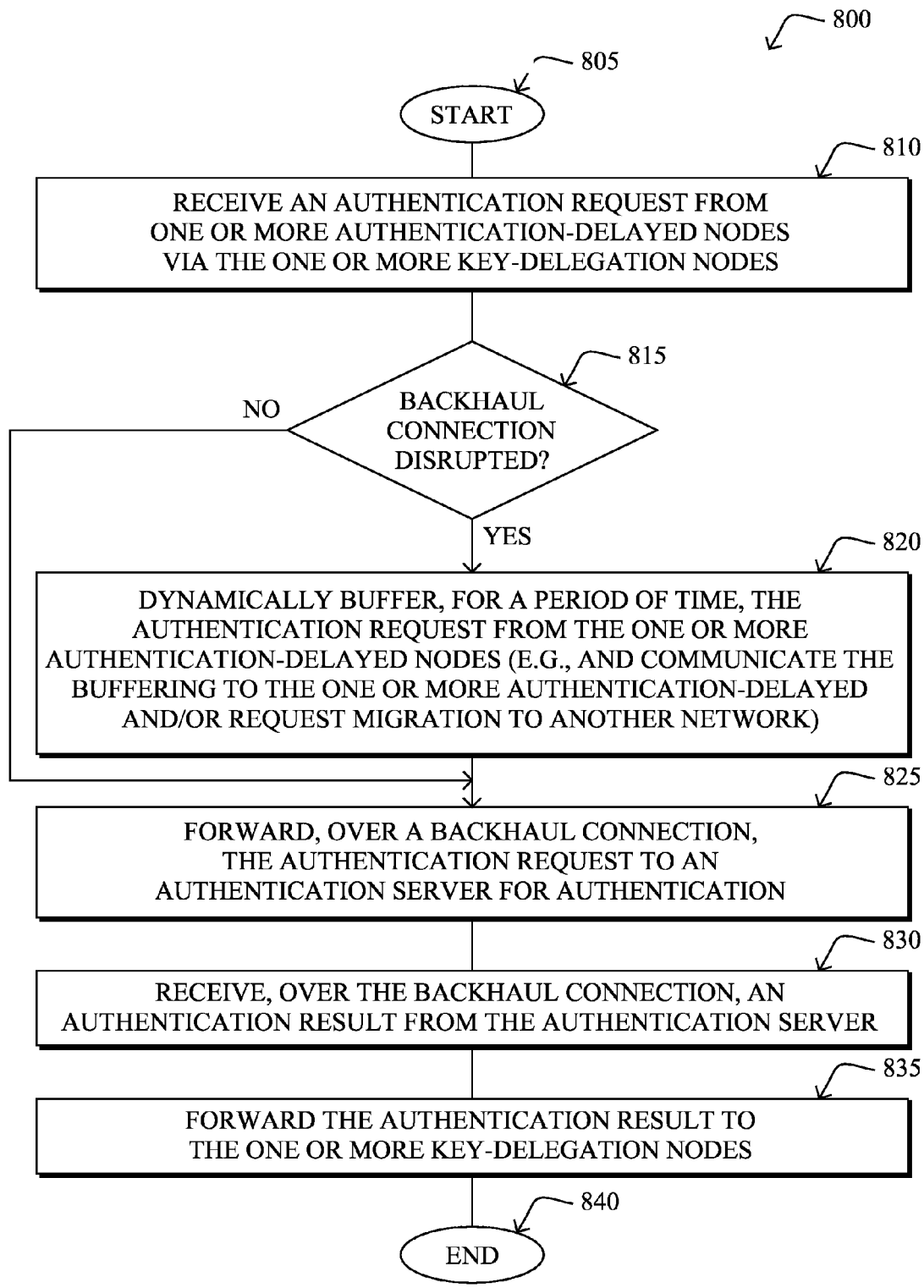
FIG. 8 illustrates another example simplified procedure for reducing authentication times in a constrained computer network, again from the perspective of a border router.

FIG. 8 illustrates another example simplified procedure 800 for reducing authentication times in a constrained computer network in accordance with one or more embodiments described herein, again from the perspective of the border router. The procedure 800 may start at step 805, and continues to step 810, where, as described in greater detail above, the border router may receive an authentication request from one or more authentication-delayed nodes via the one or more key-delegation nodes. In the event it is determined in step 815 that the backhaul connection is disrupted, then in step 820 the border router may dynamically buffer, for a period of time, the authentication request from the one or more authentication-delayed nodes. As noted above, the border router may also communicate the buffering to the one or more authentication-delayed and/or request migration to another network.

In step 825 (buffered or not), the border router may forward, over the backhaul connection, the authentication request to an authentication server for authentication, and in step 830 should receive, over the backhaul connection, an authentication result from the authentication server. Accordingly, the border router forwards the authentication result to the one or more key-delegation nodes in step 835, and the illustrative procedure 800 ends in step 840.

Figure 9:
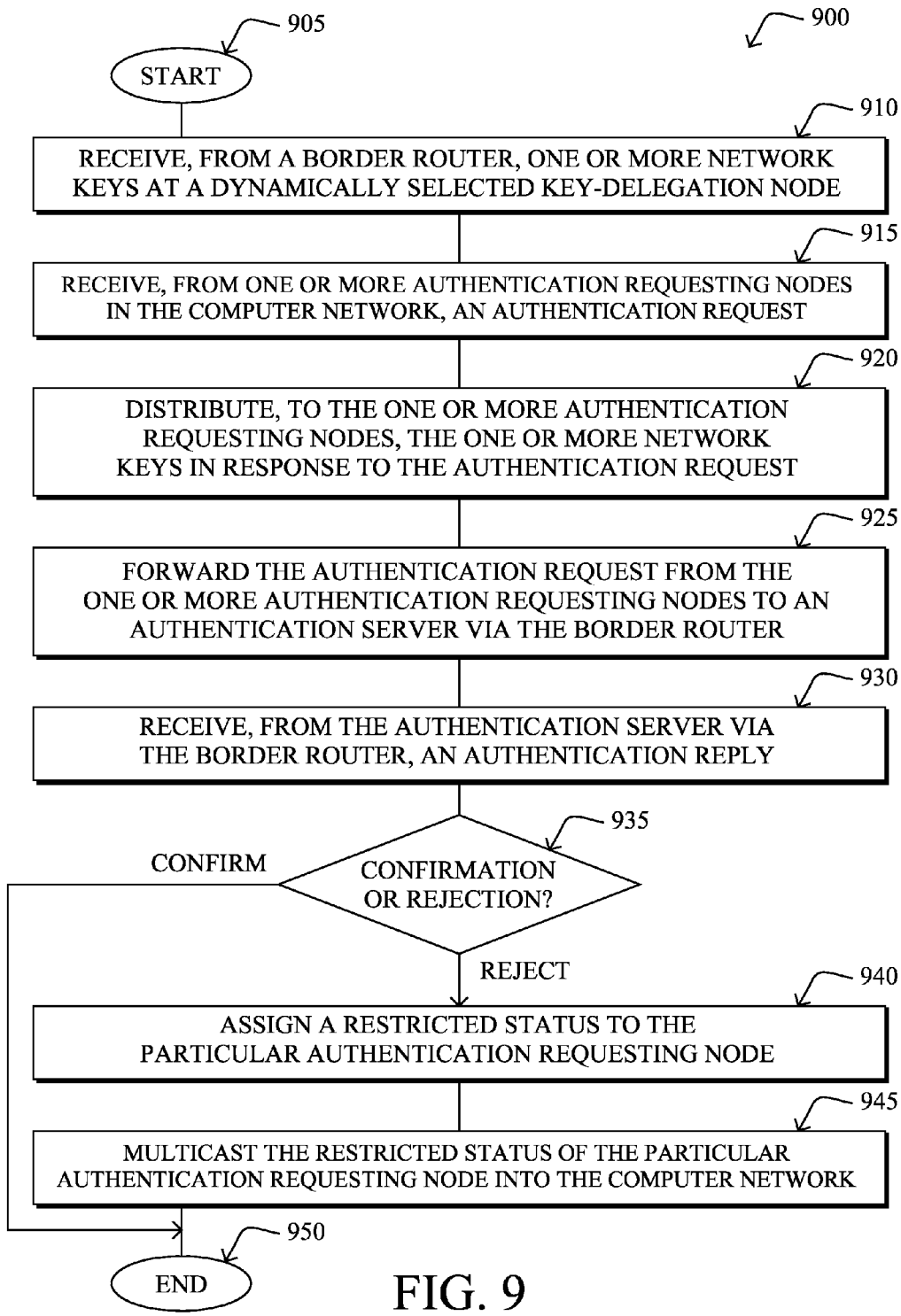
FIG. 9 illustrates another example simplified procedure for reducing authentication times in a constrained computer network, particularly from the perspective of a key-delegation node.

In addition, FIG. 9 illustrates another example simplified procedure 900 for reducing authentication times in a constrained computer network in accordance with one or more embodiments described herein, particularly from the perspective of a key-delegation node. The procedure 900 may start at step 905, and continues to step 910, where, as described in greater detail above, a dynamically selected key-delegation node receives one or more network keys from a border router. In step 915, the key-delegation node may then receive an authentication request from one or more authentication requesting nodes, and in response, in step 920 distributes the one or more network keys to the one or more authentication requesting nodes (assuming a limited number of network keys has not already been distributed).

Further, in step 925, the key-delegation node forwards the authentication request from the one or more authentication requesting nodes to an authentication server via the border router, and in step 930 may receive, from the authentication server via the border router, an authentication reply. If in step 935 it is determined that the reply is a rejection, then in step 940 the key-delegation node may assign a restricted status to the particular authentication requesting node, and in step 945 multicasts the restricted status of the particular authentication requesting node into the computer network (e.g., to prevent other nodes from communicating with the restricted node or selecting the restricted node as a parent in a DAG). The procedure 900 may then illustratively end in step 950.

Figure 10:
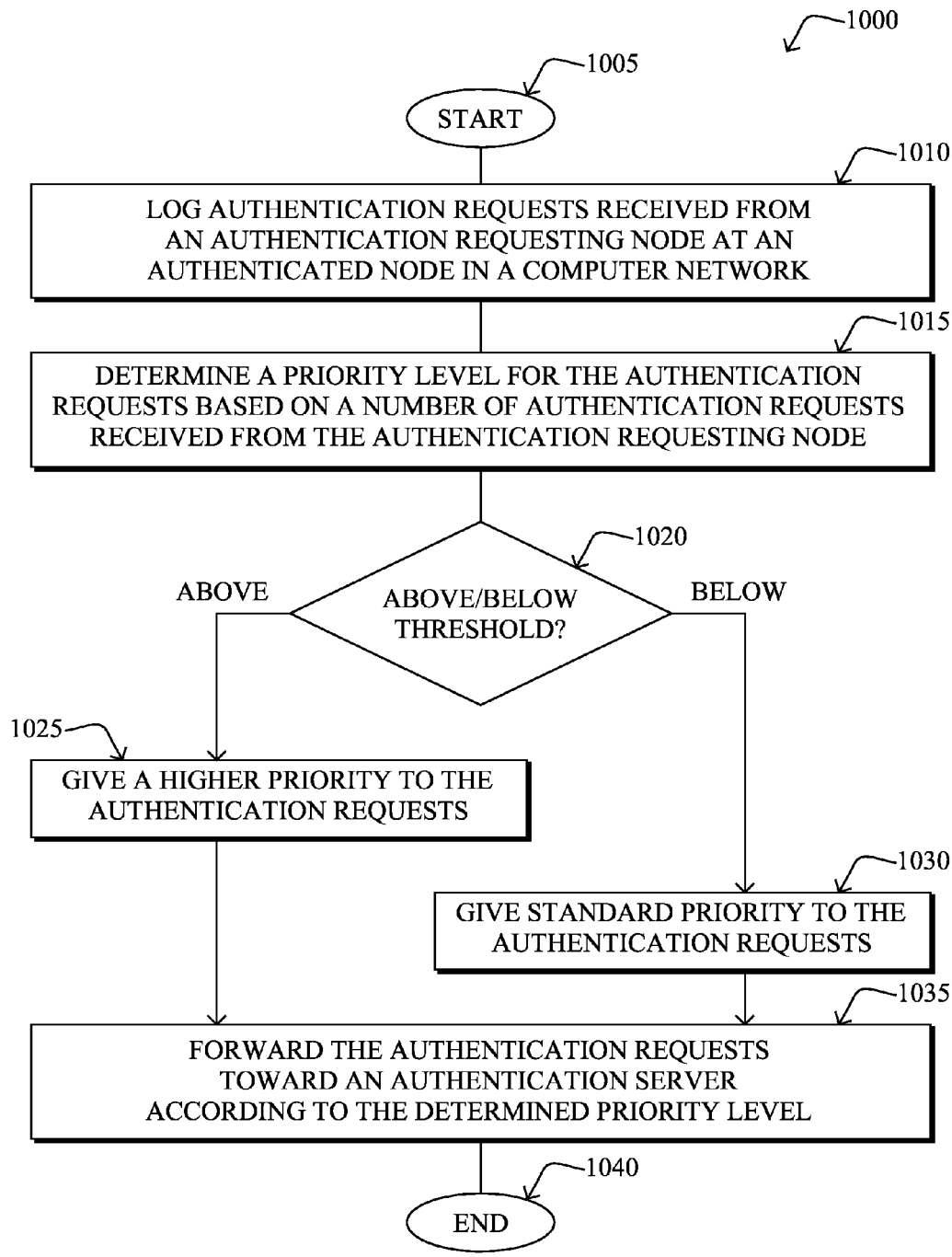
FIG. 10 illustrates another example simplified procedure for reducing authentication times in a constrained computer network, particularly from the perspective of an authenticated node relaying other authentication requests.

Moreover, FIG. 10 illustrates another example simplified procedure 1000 for reducing authentication times in a constrained computer network in accordance with one or more embodiments described herein, particularly from the perspective of an authenticated node relaying other authentication requests. The procedure 1000 may start at step 1005, and continues to step 1010, where, as described in greater detail above, the authenticated node logs authentication requests received from an authentication requesting node (e.g., storing basic information about the authentication requesting node and number of times it has requested authentication, or else storing a hash of the request, etc.). As such, in step 1015, the authenticated (relaying/transit) node may determine a priority level for the authentication requests based on a number of authentication requests received from the authentication requesting node, where if the number is above the threshold in step 1020, then in step 1025 a higher priority is given to the authentication requests when forwarded in step 1035. On the other hand, if the number is below the threshold, then in step 1030 a standard (or otherwise comparatively lower) priority may be given to the requests when forwarded toward an authentication server in step 1035. The illustrative procedure 1000 may then end in step 1040.

It should be noted that while certain steps within procedures 700-1000 may be optional as described above, the steps shown in FIGS. 7-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-1000 are described separately, certain steps from each procedure may be incorporated into each other procedure, and the procedures are not meant to be mutually exclusive.

The techniques described herein, therefore, provide for reduced authentication times in constrained computer networks. In particular, the techniques herein may increase the efficiency of authentication requesting nodes seeking to join, or re-join, a network by pushing network keys to specific, strategically placed, key-delegation nodes within the network that may relay authentication requests from the requesting nodes to the authentication server (e.g. NMS, AAA, etc.) via the Root/LBR and a backhaul connection. Authentication efficiency may be further enhanced according to the techniques herein by providing the above-described authentication request buffers for the Root/LBR, key-delegation node priority queues, and/or proactive node migration messages.

While there have been shown and described illustrative embodiments that provide for reduced authentication times in constrained computer networks, it is to be understood that various other adaptations and modifications may be made within the spirit and scope of the embodiments herein. For example, the embodiments have been shown and described herein with relation to LLN networks. However, the embodiments in their broader sense are not as limited, and may, in fact, be used with other types of constrained networks and/or protocols, such as other shared-media networks (e.g., PLC, wireless, etc.). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, from a border router, one or more network keys at a dynamically selected key-delegation node in a computer network, wherein the dynamically selected key-delegation node is dynamically selected based on a location of one or more authentication-delayed nodes in a Low power and Lossy Network (LLN);
   receiving, from one or more authentication requesting nodes in the computer network, an authentication request at the dynamically selected key-delegation node; distributing, to the one or more authentication requesting nodes, the one or more network keys in response to the authentication request at the dynamically selected key-delegation node;
   forwarding, by the dynamically selected key-delegation node, the authentication request from the one or more authentication requesting nodes to an authentication server via the border router; and receiving, from the authentication server via the border router, an authentication reply, at the dynamically selected key-delegation node, wherein the authentication reply is either confirmation or rejection of authentication, wherein when the authentication reply is a rejection, authenticated nodes are prevented from choosing a particular authentication requesting node as a parent in a directed acyclic graph (DAG).

2. The method as in claim 1, further comprising:
advertising, to the border router, capability of the key-delegation node to act as a key-delegation node.

3. The method as in claim 1, wherein the key-delegation node is limited to distribute the network key to a number of authentication requesting nodes in the computer network.

4. The method as in claim 1, further comprising, in response to a rejection of authentication of the particular authentication requesting node:
assigning a restricted status to the particular authentication requesting node; and
multicasting the restricted status of the particular authentication requesting node into the computer network to prevent the authenticated nodes from communicating with the particular authentication requesting node.

5. The method as in claim 4, wherein the restricted status lapses after a pre-determined period of time to allow for a re-authentication request from the particular authentication request node.

6. The method as in claim 5, wherein the pre-determined period of time increases based on a number of re-authentication attempts by the particular authentication requesting node.

7. An apparatus, comprising:
one or more network interfaces to communicate with a computer network;
a processor coupled to the network interfaces and adapted to execute one or more processes;
and
a memory configured to store a process executable by the processor, the process when executed operable to:
receive, from a border router, one or more network keys as a dynamically selected key-delegation node, wherein the dynamically selected key-delegation node is dynamically selected based on a location of one or more authentication-delayed nodes in a Low power and Lossy Network (LLN);
receive, from one or more authentication requesting nodes in the computer network, an authentication request as the dynamically selected key-delegation node;
distribute, as the dynamically selected key-delegation node to the one or more authentication requesting nodes, the one or more network keys in response to the authentication request;
forward, as the dynamically selected key-delegation node the authentication request from the one or more authentication requesting nodes to an authentication server via the border router; and
receive, from the authentication server via the border router, an authentication reply as the dynamically selected key-delegation node, wherein the authentication reply is either confirmation or rejection of authentication, wherein when the authentication reply is a rejection, authenticated nodes are prevented from choosing a particular authentication requesting node as a parent in a directed acyclic graph (DAG).

8. The apparatus as in claim 7, wherein the key-delegation node is limited to distribute the network key to a number of authentication requesting nodes in the computer network.

9. The apparatus as in claim 7, wherein the process when executed, in response to a rejection of authentication of the particular authentication requesting node, is further operable to:
assign a restricted status to the particular authentication requesting node; and
multicast the restricted status of the particular authentication requesting node into the computer network to prevent the authenticated nodes from communicating with the particular authentication requesting node.

10. The apparatus as in claim 7, wherein the restricted status lapses after a pre-determined period of time to allow for a re-authentication request from the particular authentication request node.

11. The apparatus as in claim 10, wherein the pre-determined period of time increases based on a number of re-authentication attempts by the particular authentication requesting node.

12. A tangible, non-transitory, computer-readable media having software encoded thereon, the software when executed by a processor operable to:
receive, from a border router, one or more network keys as a dynamically selected key- delegation node, wherein the dynamically selected key-delegation node is dynamically selected based on a location of one or more authentication-delayed nodes in a Low power and Lossy Network (LLN);
receive, from one or more authentication requesting nodes in the computer network, an authentication request at the dynamically selected key-delegation node;
distribute, from the dynamically selected key-delegation node to the one or more authentication requesting nodes, the one or more network keys in response to the authentication request;
forward, by the dynamically selected key-delegation node, the authentication request from the one or more authentication requesting nodes to an authentication server via the border router; and
receive, from the authentication server via the border router, an authentication reply at the dynamically selected key-delegation node, wherein the authentication reply is either confirmation or rejection of authentication, wherein when the authentication reply is a rejection, authenticated nodes are prevented from choosing a particular authentication requesting node as a parent in a directed acyclic graph (DAG).

13. The tangible, non-transitory, computer-readable media as in claim 12, wherein the key-delegation node is limited to distribute the network key to a number of authentication requesting nodes in the computer network.

14. The tangible, non-transitory, computer-readable media as in claim 12, wherein the software when executed, in response to a rejection of authentication of the particular authentication requesting node, is further operable to:
assign a restricted status to the particular authentication requesting node; and
multicast the restricted status of the particular authentication requesting node into the computer network to prevent the authenticated nodes from communicating with the particular authentication requesting node.

* * * * *